US009371770B2

(12) United States Patent
Leaschauer

(10) Patent No.: US 9,371,770 B2
(45) Date of Patent: Jun. 21, 2016

(54) LEASCHAUER ENGINE

(71) Applicant: Eitan Leaschauer, San Jose, CA (US)

(72) Inventor: Eitan Leaschauer, San Jose, CA (US)

( * ) Notice: Subject to any disclaimer, the term of this patent is extended or adjusted under 35 U.S.C. 154(b) by 233 days.

(21) Appl. No.: 14/172,668

(22) Filed: Feb. 4, 2014

(65) Prior Publication Data

US 2014/0182558 A1    Jul. 3, 2014

Related U.S. Application Data

(63) Continuation-in-part of application No. 13/219,384, filed on Aug. 26, 2011, now abandoned.

(51) Int. Cl.
| F02B 19/06 | (2006.01) |
| F02B 33/20 | (2006.01) |
| F02M 53/06 | (2006.01) |
| F02B 75/28 | (2006.01) |

(52) U.S. Cl.
CPC ............ *F02B 19/06* (2013.01); *F02B 33/20* (2013.01); *F02M 53/06* (2013.01); *F02B 75/28* (2013.01); *F02M 2200/29* (2013.01); *Y02T 10/125* (2013.01)

(58) Field of Classification Search
CPC ........... F02B 19/06; F02B 33/20; F02B 75/28
USPC .. 123/51 AA, 51 BA, 51 A, 51 R, 445, 48 D, 123/78 D
See application file for complete search history.

(56) References Cited

U.S. PATENT DOCUMENTS

| 1,238,223 | A | * | 8/1917 | Van Riper | F02B 1/00 123/1 R |
| 1,504,096 | A | * | 8/1924 | Burtnett | F01L 5/06 123/188.4 |
| 2,091,411 | A | * | 8/1937 | Mallory | F02B 75/228 123/143 B |
| 2,091,412 | A | * | 8/1937 | Mallory | F02B 75/228 123/143 B |
| 2,302,442 | A | * | 11/1942 | Hickey | F01L 5/04 123/188.4 |
| 2,442,082 | A | * | 5/1948 | French | C09D 173/00 123/51 B |
| 2,937,630 | A | * | 5/1960 | Norton | F01B 7/14 123/51 AA |
| 2,973,751 | A | * | 3/1961 | Blackmer | F02B 43/08 123/1 R |
| 3,438,327 | A | * | 4/1969 | Thompson | F02D 17/00 123/495 |

(Continued)

FOREIGN PATENT DOCUMENTS

DE    3541190 A1 *  5/1987 ............. F02B 19/06

*Primary Examiner* — Mahmoud Gimie
(74) *Attorney, Agent, or Firm* — Deborah Wenocur

(57) ABSTRACT

Disclosed herein is an Internal Combustion Engine (ICE) termed the Leaschauer Engine (LE). The Leaschauer Engine (LE) is a single or multiple step compression cycle ICE machine, employing the Pressure/Heat Detonation Principle (Diesel Principle). The Leaschauer Engine employs extreme combustion pressure to achieve high combustion efficiency operation without risking a pre-detonation condition.

19 Claims, 11 Drawing Sheets

(56) References Cited

U.S. PATENT DOCUMENTS

| | | | | |
|---|---|---|---|---|
| 3,446,192 A * | 5/1969 | Woodward | F02B 19/06 123/47 R |
| 3,738,332 A * | 6/1973 | Eyzat | F02B 19/04 123/275 |
| 4,104,995 A * | 8/1978 | Steinbock | F02D 15/00 123/51 AA |
| 4,159,699 A * | 7/1979 | McCrum | F02B 41/06 123/1 R |
| 4,215,657 A * | 8/1980 | Burgio | F02B 19/14 123/193.3 |
| 4,300,497 A * | 11/1981 | Webber | F02B 19/02 123/254 |
| 4,315,490 A * | 2/1982 | Webber | F02B 43/00 123/275 |
| 4,774,919 A * | 10/1988 | Matsuo | F02B 25/18 123/257 |
| 4,981,114 A * | 1/1991 | Skopil | F02B 17/00 123/51 AA |
| 6,026,778 A * | 2/2000 | Mille | G01N 33/2817 123/198 A |
| 2004/0083991 A1* | 5/2004 | Cowans | F02B 25/18 123/65 BA |
| 2004/0099887 A1* | 5/2004 | Hazelton | F02B 41/06 257/232 |

* cited by examiner

LEASCHAUER ENGINE a. CROSS REFERENCE TO RELATED APPLICATION

This application Ser. No. 14/172,668 filed Feb. 4, 2014, is related to U.S. Provisional Application No. 6/137,270, filed Aug. 26, 2010, and is a Continuation in Part of U.S. application Ser. No. 13/219,384, filed 26 Aug. 2011, and claims priority thereto.

b. FIELD OF THE INVENTION

See Also Detailed Definitions at the Next Paragraph

The featured Leaschauer Engine invention deals with new technology: an Internal Combustion Engine (ICE) where steamed misted fuel is introducing into extremely high pressure pre-compressed air (at its peak heat and pressure) in the cylinder when and where the piston is about to reach the Upper Dead Point (UDP).

- b.1 This new technology is dramatically different from the existing technology, in that it removes the engine's dependency on the octane rating of the fuel in use and dramatically increases the detonation efficiency.
- b.2 The new process holds back the misted steamed fuel droplets from entering the cylinder until completion of the critical compression stage is achieved, in contrast to the old technology wherein the atomized fuel was added into the cylinder at the beginning of the compression stage.
- b.3 Using the old technology, the optimal maximum pressure detonation point could never be achieved since the detonation would have occurred prior to any such desired pressure being achieved, thus preventing the use of combustion pressures which exceeded the detonation point.
- b.4 The Leaschauer Engine enables extremely high pressure detonation to gain efficiency extremely far beyond that achieved by gas and diesel engines. Furthermore, the Leaschauer Engine is not restricted to any fuel octane-specific detention point, in contrast to the old technology.
- b.5 The new Leaschauer (Engine) Combustion process or LCP therefore by increasing dramatically the detonation pressure while avoiding pre-detonation, increases the combustion efficiency as compared to traditional internal combustion gas engines which have been running for the last century at a very low combustion pressures (and low efficiency).
- b.6 Due to the extreme pressure detonation and the resulting extremely powerful engine strokes, it is anticipated that the Leaschauer Engine will be generally operated at low RPM, which is a desirable benefit in the industry since it further reduces fuel consumption, and increases the lifetime of the engine while reducing maintenance.
- b.7 Furthermore, low RPM reduces the injection frequency, thereby increasing the lifetime of the implemented SFD injector (described below). As further described below, a low RPM engine such as the Leaschauer Engine can be employed in electrical car applications to dramatically increase their range (see details page 4 item J).

c. FIELD OF INVENTION AND THE LEASCHAUER (ENGINE) COMBUSTION PROCESS OR LCP

The Leaschauer Engine (EL Engine) patent is designed to support the process outlined above, and in an embodiment employs a new feature, an extremely high frequency, post Synchronized Fuel Injector (post SFI).

- c.1 The claimed 'Post SFI Process' (contained as a subpart of the claimed 'Leaschauer Combustion Process' or LCP process) refers to/indicates that the Pre-Mist injection occurred after the "specific Extreme Air Pressure (specific EAP) product" compression was completed.
- c.2 The new post SFI Leaschauer Engine injector (referred to as the Synchronized Fuel Distributor Injector or SFD Injector) enables the introduction of the processed fuel component to the compressed air component of the Leaschauer Engine process.

d. THE SFD INJECTOR IS DESCRIBED, SPECIFIED, DEFINED AND CHARACTERIZED AS FOLLOWS

High kinetic energy, Steamed Fuel droplets (which exhibit a high air/fuel mixing rate or high diffusion rate) and are referred to as Pre-Mist/(Pre-Moss) Fuel product or "PMF product" are injected into:

- d.1 The specific Extreme Air Pressure (specific EAP) product (compressed air in the cylinder that already dramatically exceeded the specific pressure required to cause a detonation of the fuel intended to be used).
- d.2 The PMF product of item d.1 above is injected into the cylinder when and where the piston is close to reaching the Upper Dead point (UDP)
- d.3 The air to fuel ratio is maintained at an optimal value.
- d.4 The injector is required to inject its pre-misted fuel into the specific extreme compressed air within a pre-defined window comprising a small portion of the Leaschauer Engine working cycle.
- d.5 It is also required to define a starting point for injection relative to the UDP, referred to as the "phase", as follows:
- d.6 "Window" is hereby defined as the portion of the SFD shaft full revolution in degrees where the SFD injector valve is opened and is spraying Pre Mist Fuel.
- d.7 "Phase" in degrees (SFD shaft rotation relative to the UDP) is hereby defined as: the starting point where the SFD injector valve is set to open to spray the Pre Mist Fuel.
- d.8 It is anticipated that the process can function if injection occurs in a window less than 30 out of 360 degrees injector shaft rotation, close to the UDP. However, the preferred window, which will yield dramatically higher efficiency, is less than or equal to approximately 3 out of 360 degrees rotation near UDP.
- d.9 Sub definition of 'Working Cycle": In a 4 cycle ICE engine type, two revolutions of the main shaft are required for a complete cycle: one full revolution occurs during the compression/working stages. The 'Working Cycle' is hereby defined as the one full (360 degrees) revolution of the main shaft which includes the compression stage and the working stage. (A second revolution of the shaft is required for the exhausting and the reloading (of fresh air) stages). Therefore the window restriction requirement is measured in reference to the full 360 degrees of the 'Working Cycle')
- d.10 The PMF product is injected into the cylinder when and where the compressed air in the cylinder is close to achieving its peak heat and pressure (the pressure at that point is much higher than the specific detonation pressure point of the fuel intended to be used).
- d.11 The Leaschauer (Engine) Combustion Process (LCP) is targeted to achieve Extreme Pressure Detonation (EPD) while maintaining the air to fuel mixture uniform and in its optimal ratio to maximize efficiency.

d.12 The Leaschauer (Engine) Combustion Process (LCP) provides sufficient time to complete the detonation, burning and consuming of all the fuel components and by-products prior to or during the start of the working cycle, to ensure stability and cleanliness of the process.

d.13 The implemented injector (SFD Injector) is designed to inject high pressure fuel supplied by an external pump into the extreme compressed air pressure in the cylinder with enough force to propel the mist into the highly pressurized compressed air in the cylinder.

d.14 The pressure for the inlet fuel should preferably be 10K-40K PSI to block return gases from the cylinder, although it is anticipated that inlet fuel pressures in the range of 2K-400K PSI can be used.

d.15 The injector must be able to switch on-off at a rate in the range between $1/1000$ second and $1/100,000$ second, although it is anticipated that a switching rate of 1:10000 of a second will be sufficiently fast for the fuel pressure range described.

d.16 These numbers are applicable for a shaft rotation speed between 700 to 6000 RPM, although a preferred rotation speed is approximately 2000 RPM.

d.17 The Leaschauer Engine is designed to support the development of electric cars which employ a redundant fuel power source to dramatically increase (and ensure) their long range capacity.

d.18 For electric cars, the car's main driving power (as well as its speed/performance function) is generally provided by the main electrical motor coupled with a battery pack. A low RPM Leaschauer Engine could function as a support during long trips when the battery pack might become exhausted and requires recharging.

d.19 The recharging could occur in a calculated fashion that would typically avoid the need for a high RPM supporting engine.

e. DEFINITION OF TERMS USED IN THE ARTICLE AND INVENTION BASIS OF OPERATION

Definitions: Described hereinafter are definitions of some frequently used terms in the application to assist the reader in understanding the technology.

e.1 Definition 1: Multi Compression Steps (MCS) ICE Engine:
An engine configured to dramatically increase the atmospheric pressure by using sequenced multiple compression stages to increase its combustion efficiency (when mixed with atomized fuel at the optimal ratio), to assist with radiated parasitic heat, and to reduce the mechanical load on the pistons, rods and crankshaft at the final stage.

e.2 Definition 2: Pre (compression) Sequenced Fuel Injection (or Pre SFI):
A method to inject fuel droplets into lower than/mid-pressure of atmospheric pressure air (by injection or other way) prior/during to the beginning of the compression stage.

e.3 Definition 3: Post (compression) Sequenced Fuel Injection (or Post SFI):
A method to inject atomized (steamed) fuel foam into compressed air at its peak high pressure and heat stage for high efficiency combustion.

e.3.1 In other words, to time and manipulate the detonation timing by accurately controlling and timing the fuel injection moment. This process provides the benefit of enabling extreme high compression combustion without risking pre-detonation.

e.3.2 This benefit is gained by holding the fuel droplets out of the cylinder until seeking detonation to occur. This method dramatically reduces any dependency on the octane in use.

e.4 Definition 4: Sequenced Fuel Injector (SFI):
A high pressure fuel source that can overcome the peak pressure and heat existing in the cylinder in proximity to the detonation point, and that can deliver the calculated fuel mass required at that moment, by injecting atomized steamed fuel droplets when detonation heat and pressure conditions in the cylinder are met.

e.5 Definition 5: Extreme Frequency Fuel Injector:
An extreme frequency on/off fuel valve (which may be mechanical, electrical or other type such as piezoelectric), capable of delivering a series of small quantities of synchronized atomized (steamed) fuel droplets (Pre-Moss) by switching on-off at a rate in the range of micro seconds.

e.6 Definition 6: Optimal Detonation Conditions (of ICE Machine):
The conditions (pressure and heat) developed in the cylinder, that cause a specific fuel (defined by its type and octane number) to detonate (when it is in its optimized air to fuel ratio)

e.7 Definition 7: Pre-detonation:
The undesired condition where the pressure in the cylinder exceeded the specific detonation pressure point and ignition (detonation) prior to achieving the desired detonation pressure.

e.8 Definition 8: Leaschauer Engine (LE) machine employing Post (compression) Sequenced Fuel Injection (Post SFI) process:
An engine utilizing a single or multiple step extreme compression process designed such that the detonation is timed and manipulated, by controlling the fuel injection moment to occur post-compression, at substantially the final (highest pressure) point.

e.9 Definition 9: Specific Extreme Air Pressure (Specific EAP) (in conjunction with the SFD Injector and LE Machine) is hereby defined as:
Compressed Air in its final compression (heat) stage, when and where the piston in the cylinder is close to reaching its Upper Dead Point (UDP). The pressure has already dramatically exceeded the specific pressure (and heat) required to detonate the fuel intended to be used.

e.9.1 Such pressures are in the range of: for a gas engine between 170-2400 PSI and for a diesel engine 330-3000 PSI, while maintaining a predefined detonation point in the time and place of the process which permits sufficient time for consuming and completion of the burning of all fuel/(by-product) components, at the power stroke, for the most efficient, clean and stable process.

e.10 Definition 10: Pre-Mist/(Pre-Moss) (processed) Fuel or PMF (in conjunction with the SFD Injector and EL Machine):
Referred to as the 'processed fuel component', which converts high pressure fuel into atomized, steamed, high kinetic energy, fuel droplets (which exhibit an extremely high diffusion capability).

e.10.1 When and where the such Pre-Mist processed fuel is introduced with the Specific Extreme Air Pressure (Specific EAP) in the cylinder, it avoids the formation of non-uniform air fuel packets (during the very short window available to conduct such a diffusion).

e.10.2 Thereby avoiding a dramatic reduction of the efficiency, cleanliness and stability of the detonation, while maintaining an optimal air to fuel ratio during the process.

e.10.3 The PMF is injected to the EAP at a point in time and space where the pressure and heat in the cylinder already dramatically exceeded the detonation pressure of the fuel intended to be used.

e.11 Definition 11: Extreme Pressure Detonation (EPD) is hereby defined (in conjunction with the SFD Injector and EL Machine) as:

preconditioned detonation which occurs as a result of the introducing of the (previously defined) Pre-Mist processed Fuel component into the (previously defined) Specific Extreme Air Pressure (Specific EAP) components.

e.11.1 This occurs while air to fuel ratio is at an optimal value, the pressure has already dramatically exceeded the pressure required to detonate the fuel intended to be used, and sufficient time has been allowed to complete the burning and consuming of all the fuel component/by-product at the power stroke for most efficient, clean and stable process.

e.12 Definition 12: Pre-Mist Mixture (PMM) is defined as:

The extremely non stable final Air-fuel product that results from the diffusion of Pre-Mist Fuel (PMF) with the specific Extreme Air pressure (EAP) (heat). Under these conditions the Pre-Mist Mixture (PMM) is in an extremely unstable condition.

e.12.1 Thereby causing detonation in a very short time from its formation (in the range between milliseconds and microseconds, depending on the pre-compressed pressure and heat in the cylinder, and the quality of the pre-mist fuel injected).

e.13 Definition 13: (the featured implementation) Extreme pressure Synchronized Fuel Distributor Injector (SFD Injector) is hereby defined as:

A high frequency fuel line valve (i.e., on/off fuel switch) injector which may be but is not limited to an electromechanical, rotating, extremely high frequency multi redundant channel fuel valve, having an injector shaft (FIG. 9, 507) which is mechanically an integral part of Rotating Head (FIG. 9, RH-600), synchronized to the Leaschauer Engine Machine (LE Machine) main shaft (with a gear ratio of 2:1).

e.13.1 The SFD injector is designed to inject the high energy, steamed fuel droplets (Pre-Mist/Pre-Moss Fuel 'PMF' effect) within a tightly constrained window of preferably 3 degrees or better of the working cycle injector shaft revolution.

e.13.2 And to deliver the specified high energy, steamed, atomized fuel droplets at an accurate phase characterized by the piston reaching its optimal heat and pressure at approximately the Upper Dead Point (UDP).

e.13.3 The above specifications are required to achieve the most efficient extreme pressure detonation while permitting sufficient time for all by-products to be fully consumed. The device is utilized in the Post (compression) Sequenced Fuel Injection (Post SFI) process.

e.13.4 Such an Injector may be structured, but is not limited to, the device described below and referred to as 'SFD injector'. See general description below and supporting drawings (FIGS. 9, 10 and 11) characterized in this article f. A GENERAL DESCRIPTION OF THE SYNCHRONIZED FUEL DISTRIBUTOR (SFD) INJECTOR The description below refers to FIGS. 9, 10 and 11 f.1 SFD Injector, structure and principle of operation.

The SFD Injector may be designed and implemented (but is not limited to), in accordance to the following principles and structural design:

f.2 The assembled Stator Housing constructed with circular geometry (SH-700) comprises a Rotating Head (RH-600). Injector main shaft 507 is mechanically an integral part of rotating head (RH-600).

f.3 The Rotating Head (RH-600) utilizes a Hollow Rotating Tunnel (HRT-575, 610). The (HRT 610) is aligned with Stator Hollow Cave (SHC-640) located at the Stator Housing (SH-700) to enable extremely high pressure fuel to flow from the Inlet Fuel Connector (IFC-730, 740, 750) located on the housing stator.

f.4 Such 'high pressure fuel' enabled to flow via Stator Passage (760, 660) via the Stator Hollow Cave (SHC-640) to the Hollow Rotating Tunnel (HRT-610, 575) of the Rotor Head (RH-600).

f.5 As long as the Rotor Distributing Windows (RDW-550, 675, 710, . . . 720) are not aligned with their coupled Stator Distributing Windows (SDW-560, . . . 685,) the high pressure fuel line is cut off.

f.6 But, when the Rotating Distributing Windows RDW-550, 675, 710, . . . 720) are aligned with their coupled Stator Distributing Windows (SDW-560, . . . 685) the fuel is enabled to flow from:

f.7 The Stator Fuel Cave (SFC-640, 660) via the Hollow Rotating Tunnel (HRT-610, 575) via the Rotor Distributing Windows (RDW-550, 675, 710, . . . 720) to the (SDW 560, . . . 685) windows via the Electrical Cut-off Valves (ECV 570, 680, 880, . . . 890) if they are activated in their "Open" position) to the Heated Injection Nozzles (HIN-580, . . . , 655).

f.8 The fuel can then to be delivered to the cylinder where the piston is close to reaching its peak pressure and heat, to cause a detonation to occur.

f.9 Since in a full 360 degree rotation of Rotating Head RH 600, in an embodiment the Rotor Distributing Windows are aligned to the Stator Distributing Windows during only 3 degrees injector shaft rotation out of the full 360 degree rotation, this will dictate that injection occurs only within those 3 degrees.

f.10 And since the Rotating Head (coupled to the injector shaft) is geared to the main shaft of the engine in a gearing ratio of 2:1, this will ensure that the injection will occur during the working cycle, and will maintain the injection phase at the preferred time and place where and when the piston is close to reaching the Top Dead Point (UDP).

f.11 The circular geometric structure of the injector further maintains the restricted activation angle (3 degrees rotation in an embodiment). The cutoff ECV valves are deployed to start or shut off the engine, or to cut off redundant fuel lines to reduce the amount of fuel mist reaching the engine.

f.12 There the ECV valves may be rated to a lower switching rate (by as much as a factor of 60) than that of the injector switching rate, since the 180 degree main axle revolution of a working cycle should be satisfactory for the cutoff valves, in comparison to the 3 degrees (in the preferred embodiment) for the SFD Injector.

f.13 During normal operation, at least one of the ECV valves is maintained in the open state to inject timely, and to cause a detonation to occur.

f.14 The Rotating Head Pulley (RHP-505) is attached to injector shaft 507, and is geared by non skid belt (760) to the EL-Engine main shaft in such a fashion that for every two full revolutions of the engine shaft, the SFD Injector's rotor will complete one revolution (i.e., there is a 2:1 gearing ratio).

f.15 By manipulating the Injection Phase Event (IPE) to occur at the most suitable moment:

f.16 When and where the "window" maintained 3 degrees in the preferred embodiment and when and were 'Pre-Mist Fuel (PMF)' is introduced to the specific extreme pressure air at approximately the Upper Dead Point UDP.

f.17 On those described conditions the Pre-Misted fuel mixture is caused to detonate, at top efficiency (taking into consideration a proper delay between the injection event and detonation, allowing sufficient time for all the fuel product and by-product to be consumed).

f.18 In other words, the belt, pulley and gearing mechanism are designed to manipulate and time the injecting event so that it occurs when and where the right detonation conditions are met in the cylinder.

f.19 The multiple online Electrical Cut-off Valves online (ECV 570, 680, 880, . . . 890) are designed primarily but not limited to, controlling the momentary fuel mass required to be injected into the cylinder, as well as serving a fuel cut-off function and providing multiple auxiliary injecting lines for stability.

f.20 The multiple auxiliary injecting line valves also may increase the full mass required during the injection stage.

f.21 The Heated nozzles (HIN-580, . . . , 655) function to increase the kinetic energy of the fuel, and to steam it for better atomization, thereby increasing its diffusion ability for better fuel/air mixing during the short window available for such mixing.

f.22 The heated nozzles inject the steamed, vaporized, high pressure, high energy fuel droplet foam into the cylinder to provide optimal air/fuel mixing during the short injection window, to avoid the creation of packets of non uniform mixture in the injection stage, which could reduce the efficiency factor and cleanliness of the combustion.

f.23 The Electrical Connector (EC-530) supplies the electrical requirement needs of the cut-off valves in terms of control, signals along with power supplying source for the Pre-mist Heating Elements (PHE-630, . . . , 673).

f.24 The SFD injector is further designed in such a way that the Rotating Distributing Windows (RDW) are sealed against their coupled (SDW) windows to prevent the high pressure fuel from leaking out to the Outer Surface (OS-585) of the stator-rotor sliding area.

f.25 This implementation may employ, but is not limited to, a spring loaded (SL 590, 695) sealing sleeve mechanism (SSM 540, 690, 605 . . . ).

f.26 A similar arrangement is used to seal the SFC to the HRT to prevent fuel leakage out of the bottom sliding surfaces (BSS 670), using spring loaded (SL 665) and sealing sleeve mechanism (SSM 620).

f.27 Item (RS 515) is a rotating seal to prevent fuel leakage out of the SFD main shaft. Item (FT 650) is the Fasten Thread part of the SFD injector used to fasten it to the Leaschauer Engine.

g. BACKGROUND TO DEVELOPMENT OF THE SFD INJECTOR

The SFD injector invention is designed to improve and overcome the weaknesses and low efficiencies of the old technologies derived from two types of injectors:

g.1 Vacuum-loading Injector technology:
Referred to as Vacuum-loading Injector, such technology was developed in the 1970's, to replace the carburetor device which had been used since the development of the ICE Engine.

g.2 The Vacuum-Loading Injector is located on the mixture inlet manifold and is activated when the piston is forced down from the Top Dead Point (TDP) (after the exhaust cycle) to inlet fresh fuel mixture into the cylinder.

g.3 This type of injector does not require a lot of energy to operate, due to the low pressure in the inlet manifold. The time available for loading the fuel mixture in this type of system is ½ of the work cycle, corresponding to a time response of 0.02 of a second, assuming 3000 RPM and ½ of the working cycle.

g.4 The vacuum loading injector was the first injection technology to be introduced, most likely because of the simplicity of the assembly. Since in this process the fuel droplet mixture is introduced into the piston in the pre-compression stage, the process is limited to operating below detonation pressure (pre SFI) and thus is limited to and sensitive to the pre-designed octane, and resulting in low efficiency.

h. DIRECT INJECTING (INTO CYLINDER) TECHNOLOGY

Referred to as Direct Injection (into cylinder) type. In this technology, the injection is still activated at the vacuuming stage or at the start/mid of the compressing stage. This method was introduced and has been developed since the end of the 20$^{th}$ century.

h.1 This technology provides some increase in efficiency compared to the vacuum-loading injector technology, but since the fuel is still injected at a pre-SFI point the detonation maintains its sensitivity to the octane in use, and the process is still limited to low-to-mid compression pressures in the cylinder and again dependent on the octane in use.

h.2 Both of these types of injectors currently in use are typically limited to 0.005 of a second injector time response.

h.3 The problem with those old technologies is that the fuel is introduced before or at the start of the compressing cycle (Pre SFI) process and as a result the detonation is fuel octane dependent, highly sensitive to the octane in use, requiring an expensive fuel octane improvement to attain higher efficiency.

h.4 There is a limit to the feasibility of improving the octane number, particularly since the cost of further octane improvement rises dramatically at a certain point. As a result, the development of existing injector technology to achieve higher efficiency has virtually reached a dead end.

h.5 In other words since the old technologies are limited to low/mid detonation pressures, this limitation prevents the dramatic improvement of engine efficiency which could be achieved by increasing the detonation pressure beyond the fuel Specific Detonation Point (SDP).

h.6 It appears that one of the main reasons that higher efficiency injection processes have not been pursued is the lack of an injector which could switch on and off to introduce the steamed fuel droplets to the cylinder in the restricted critical window smaller than 3 degrees rotation of the working cycle in the preferred embodiment;

h.7 i.e., with switching times smaller than 0.5 Millisecond (0.0005 second in an embodiment, calculated assuming 1000 working cycle revolutions, derived from shaft frequency of 2000 RPM) and with repeatability better than 10 µs, which is a preferred condition to support such a breakthrough in the injector technology. This is the purpose of the inventive injector technology disclosed herein.

i. FEATURING REQUIREMENT, DESCRIPTION AND WAY OF OPERATION i.1 The introduction of the EL-Engine requires a new type of injector having a very short on/off switching time requirement, 0.5 of a millisecond (0.0005 of a second) in an embodiment. The injector further requires extreme repeatability in the range of less than 10 µs in an embodiment, to gain stability.

i.2 The injector must provide the ability to switch on/off a fuel line operating at greater than 10K PSI in an embodiment to overcome the extreme pressure buildup in the cylinder. The injector is also required to control the delivery of the fuel mass in the short time window available.

i.3 The featured new EL Engine technology introduces the Synchronized Fuel Distributor Injector (SFD injector) which is designed to carry out the requirement of accurately injecting the high pressure Pre-Mist (steamed fuel droplets) right at the desired moment to maintain efficient detonation.

i.4 This injector is further designed to be employed during a very short time window, to perform an injection cycle where and when the piston is close to reaching its Upper Dead Point (UDP) when the pressure and heat in the cylinder are at peak value, to enable the achievement of its most efficient performance.

i.5 Along with the high on-off switching frequency, required in an embodiment to be faster than 3 degrees injector axle rotation of the working cycle and achieved by the circular geometric shape of the valve.

i.6 The injector is also required to be able to manipulate the Injection Activation Phase (IAP) so the injection would occur at the exact desired time and space window (i.e., a certain number of degrees rotation before the UDP, with repeatability better than 10 µs in an embodiment.

i.7 This function is achieved by employing the gearing mechanism which synchronizes the injector valve to the main shaft with a 2:1 gearing ratio. It also requires the ability to initiate and end the injection interval at the required phase.

i.8 For example, in a preferred embodiment start injecting at (−6° injector axle rotation) before Upper Dead Point (Before UDP) and quit at (−1° injector axle rotation) before UDP.

i.9 It is anticipated that the system will work with a phase whereby injection starts up to 15 degrees injector axle rotation before UDP, and stops up to 15 degrees injector axle rotation after UDP.

i.10 The multiple auxiliary lines along with the ECV valves were added to manipulate the fuel mass injection requirements, to increase stability and to function as fuel cutoff valves.

i.11 The Synchronized Fuel Distributor Injector (SFD injector) was designed specifically to satisfy the special requirements dictated by the EL-Engine specific needs, to enable the increasing the pressure in the cylinder prior to introducing the misted fuel foam, to achieve extreme detonation pressure in the cylinder.

i.12 The next section is describing the EL Engine which when coupled with the SFD Injector could perfect the new technology:

The conventional ICE machine has been in use for a very long time. Typical compression ratios in a conventional ICE machine are about 1:10 for a gas engine, and for a diesel engine up to about 1:22.

It is well known in the art that higher combustion pressure yields higher efficiency burning of the gas used. However, there are several reasons why high combustion pressure ICE's are problematic. A first problem inherent in high combustion pressure engines is the necessity for increasing the octane of the gas accordingly, since lower octane gas detonates at a lower pressure and heat, therefore premature detonation would occur in a higher combustion pressure engine unless higher octane gas were used. Chemical limitations to the improvement of gas octane, as well as the high price of high octane products contribute to the limited development of a higher compression gas engine.

A second limitation to the development of higher compression ratio diesel engines is a mechanical limitation. As the compression increases, the mechanical stress on the piston, rod, and crankshaft assembly increases accordingly. For example, a piston having an area of 12 square inches, at pressure of 300 PSI (which is close to the typical pressure resulting from a compression ratio of 20:1, equal to temperature-corrected atmospheric pressure×compression ratio) would yield a force of 3600 pounds on the piston rod. Higher compression ratios would increase the force proportionately. The mechanical stress on the thin piston rod has limited the increase in compression ratios. As existing technologies have entered a "dead end" and are failing to achieve higher combustion pressures, there is a need (which may be one of the world's highest priorities) to step in with a new dramatically, more energy efficient ICE technology, that is pushing the limits of combustion efficiencies to extreme values and therefore increasing combustion efficiency and reducing gas consumption. This would greatly reduce the environmental impact of pollution and global warming.

SUMMARY

Disclosed herein is a novel ICE termed the Leaschauer Engine (LE). The Leaschauer Engine (LE) is a single or multiple step compression cycle ICE machine, employing the Pressure/Heat Detonation Principle (Diesel Principle). The Leaschauer Engine differs significantly from a conventional ICE machine by its ability to employ extreme combustion pressure to achieve high combustion efficiency operation without risking a pre-detonation condition.

The unique design of the "Leaschauer Engine" allows the use of any fuel (regardless of its octane number) or a mix of fuel products, adjusting itself automatically to temperature and barometric pressure variations.

In its Post (compression) Sequenced Fuel Injection (SFI) version, the inventive technology differs significantly from the conventional technology as follows:

The inventive dual compression step structure enables extreme compression ratios, greater than 1:22.

Both for the dual compression step structure and for the single compression step structure, the sequencing of injection of atomized fuel/gas foam to inject it at a peak pressure and heat when a desirable detonation point is reached, removes the risk of pre-detonation. As a result, the inventor has recognized that this fuel injection sequencing enables the use of lower octane fuel.

Due to its extreme combustion pressure the Leaschauer Engine is environmentally friendly, i.e. reducing dramatically the exhaust of burning by-products, and the release of residual heat into the atmosphere.

The claimed Leaschauer Engine (LE) technology deals with several solution embodiments to increase the efficiency of Modern Internal Combustion Engine (ICE) machine:

A first proposed solution is referred to as a single or multiple stage post (compression) ICE machine. This includes the apparatus and process that support the employment of a Sequenced Fuel Injecting (SFI) process wherein the fuel (gas) is delivered right at the peak compression pressure and heat conditions into the cylinder, to achieve high pressure combustion efficiency. In other words, the fuel (gas) is held out of the cylinder during the sequenced compressing cycle to enable controlling and timing of the detonation occurrence without risking a pre-detonation event. A first embodiment of the post-compression ICE machine employs a larger, lower compression primary cylinder, and a smaller, higher compression mini-cylinder coupled to the primary cylinder.

A second embodiment of the post-compression ICE machine, termed the Leaschauer Gas Engine (LGE), is a single compression stage high efficiency post SFI engine (See FIG. 8)

A second proposed solution is referred to as a Multiple Compression Stage (MCS) ICE machine employing a Pre SFI process, wherein only at the last, high-compression stage (i.e., the mini-cylinder as described above) the detonation conditions of heat and pressure are met.

Practical structural details to enable implementation of either the post-compression SFI or pre-compression SFI methods are described in the Practical Implementation Example for Leaschauer Engine (LE) Dual (or more) Compression Stages. Included in the practical implementation example are: 1. means of enabling the compression ratio to exceed 1:22 without risking pre-detonation; 2. means of enabling the coupling of the low and high compression stages; and 3. a mechanical gearing mechanism to ensure the timing and sequencing of the entire machine.

A GENERAL DESCRIPTION OF THE DUAL STEP HIGH COMPRESSION OPERATING CYCLE

In an embodiment of the "Leaschauer Engine", the engine employs a second compressing step that is added to the existing conventional ICE machine.

By dramatically reducing the area of the second stage piston (also referred to as the mini Piston), for example: by a factor of 20, and by leaving intact the conventional pressing mechanism (i.e.: Crankshaft, electrical or hydraulic mechanism), the Mini Piston can achieve extreme combustion pressure (for example: forcing the piston to 1600 pounds using the conventional compressing mechanism, the mini piston could achieve a static combustion pressure of 1600 PSI, assuming the Mini Piston area is 1 square inch).

The second stage piston of the Leaschauer Engine enables the employment of extreme combustion pressure without the need to significantly change the compressing mechanism. The Leaschauer Engine brings the dual stage ICE engine to a new era of extreme efficiency and clean combustion operation.

This novel technology is an integral part of the claimed invention.

PRINCIPLE, BRIEF DESCRIPTION AND METHOD OF OPERATION

Figure 1:
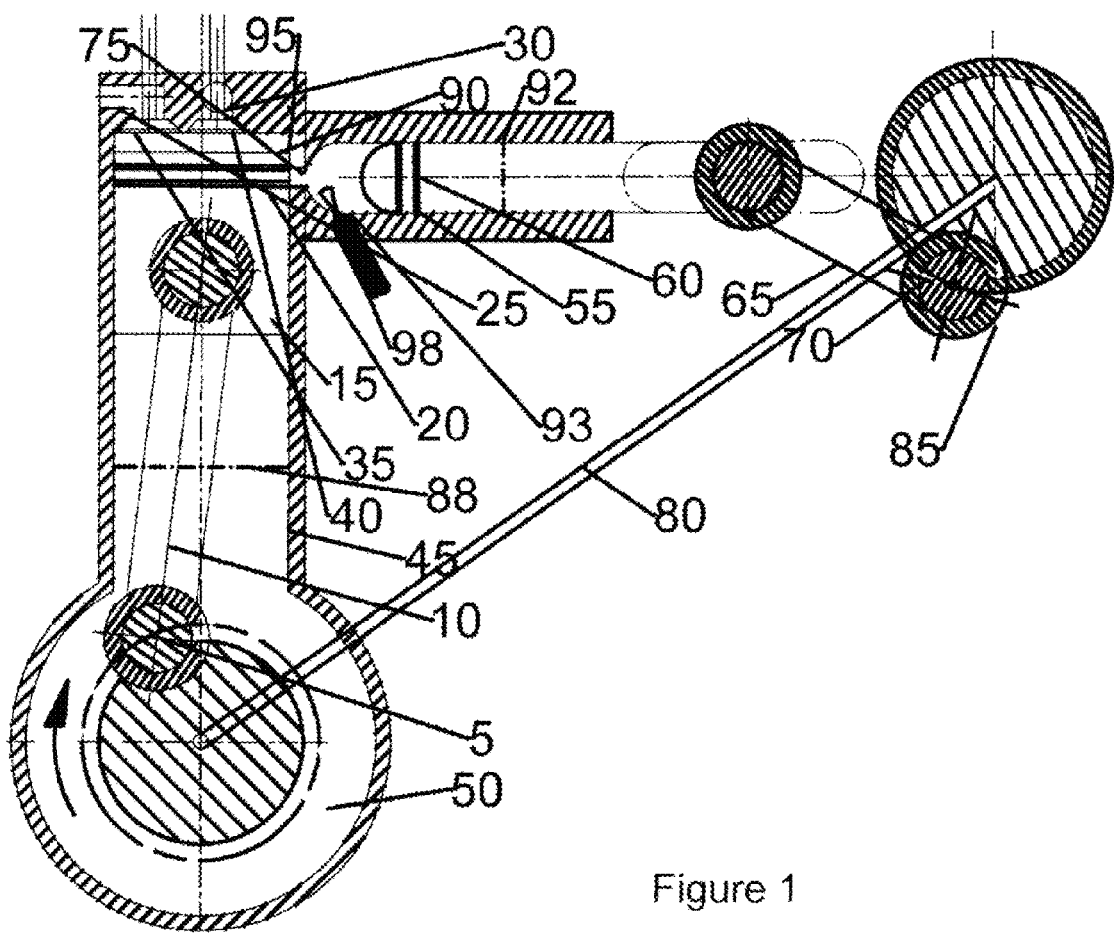
FIG. 1 is a diagram illustrating principles of operation of the dual step high compression cycle.

FIG. 1 illustrates the principles of operation of the Leaschauer Engine. The elements shown in FIG. 1 are listed below:

5. Crankshaft Main.
10. Connection Rod Main.
15. Piston Main.
20. Piston Rings Main
25. Exhaust Vent valve
30. Mixture (or air) Inlet
35. Exhaust Valve
40. Mixture (or air) inlet valve
45. Main Cylinder
50. Main Oil Reservoir
55. Mini Cylinder
60. Mini Piston
65. Mini Connection Rod
70. Mini Crankshaft
75. Cylinders Connection Hole
80. Timing Gear Mechanical
85. Mini Oil Reservoir
88. LDP Main
90. UDP Main
92. LDP Mini
93. Mini UPD
95. Main Piston Leading edge
98. Post SFI injector system To better understand the operating principles of the new Leaschauer Engine, its unique structure, its method of operation and functionality, it is important to start with the description of the Compression Cycle, which is unique to the Leaschauer Engine The Compression Cycle, Preconditions Snapshot Prior to the start of the compression cycle, the Main Piston 15 traveled from Main UDP 90 down toward Main LDP 88 while (for the pre SFI) the inlet/mixture/Air valve 40 is open to input or vacuum mixture (air/fuel for the pre-compression SFI version, or only air in the Post compression SFI version) into the cylinder space. The Mini Piston 60 is maintained at Mini LDP 92.

When the Main Piston 15 reaches LDP 88 the preconditions are as follows:

Main Cylinder 45 contains:

Fresh air (in close to atmospheric pressure or higher if turbo is installed) for the Post SFI version;

A mixture of air and atomized fuel foams in the Pre SFI version.

The inlet valve 30 and the exhaust valve 35 are in their closed states.

The Compression Stage Begun:

The Main Piston 15 (when all preconditions are met) travels from its Main Lower Dead Point ("LDP") 88 up the Cylinder 45 towards the Main Upper Dead Point ("Main UDP") 90. The mixture (or air) is being compressed. While the main piston travels up towards the Main UDP some of the compressed mixture (or air) passes through the passage 75 to the Mini-Cylinder 55 to maintain pressure equilibrium. (At that stage the Mini Piston 60 is kept at the Mini Lower Dead Point, ("Mini-LDP"), 92.

B. Main Piston Leading Edge has Passed the Cut Off Point

When the Main Piston reaches UDP 90, the mixture (or air) is fully contained in the Mini Cylinder 55. At that point the Main Piston Leading Edge 95 has already passed the narrow passage "75" (the cut-off point) and the mixture (or air) is fully contained and locked in the Mini Cylinder 55.

Note: Throughout the article the term "air" indicates the Post SFI version, the term "mixture" indicates the Pre SFI version.

C. Mini Cylinder is Further Compressing the Mixture (or Air)

The Gearing Mechanism 80 is engaged and forces the Mini Piston to travel towards the blocked passage 75 (Mini UDP) to further compress the mixture (or air) and bring it to extreme pressure and heat.

D. Detonation

D.1 For the Pre-(compression) SFI case, the extreme pressure and heat developed during the compression cycle in the Mini Cylinder 55 detonates the mixture at a point located along the Mini Piston's journey upward (towards Mini UDP 75). At that point in the cycle for the Post (Compression) Sequenced Fuel Injection (Post SFI) version the Sequenced Fuel Injector (SFI) 98 injects atomized fuel into the compressed air at its peak high heat and pressure and causes the atomized fuel to detonate.

D.2 The detonation Point is dependent on the fuel's octane, and on the combustion pressure and heat.

D.3 The detonation point along the Mini Cylinder 55 (for the pre SFI version) does not affect the timing of the Work Cycle in the Main Cylinder at all; its timing only depends on the Leading Edge 95 which determines the cut-off point of the Main Piston (or a valve, if one is chosen to be used).

D.4 When its start its journey down, the Main Piston 15 exposes opening 75 by the leading edge 95 and opens the way for the post burned gases to break through the opening 75 and force the main piston 15 down to start the work cycle journey.

D.5 Without losing the generality of the principle description above the process above is an integral part of the claimed invention.

E. The Non Dependency Effect (NDE) of the Leaschauer Engine

E.1 As evidenced from sections D.2-D.4 there is no direct correlation between the detonation timing event (in the Mini Cylinder 55) and the leading edge 95 timing event (i.e., exposing the passage 75 by the leading edge of the main piston 15). Therefore there is no dependency between the Work Cycle and the Detonation Point.

E.2 As a result, the Leaschauer Engine's performance is unaffected by changes in barometric pressure or temperature or by the fuel's octane in use, (unlike conventional ICE engines).

E.3 Accordingly, the design of the Leaschauer Engine ensures that the main work cycle follows the detonation event depending only on the location of the leading Edge 95 in reference to the passage 75 (the exposing point/cutoff point). This fact reduces dramatically any dependency on the fuel in use.

F. The Work Cycle

F.1 Position of pistons:

F.1A Mini Piston

At the beginning of the work cycle the Mini Piston is positioned just before Mini UDP 93, which at that stage is already under a heavy load of post detonation gases, (at a high energy potential) ready to assist in the work cycle. At that stage the Load, Gearing Mechanism and the Connecting Rod are holding the Mini Piston from rolling down.

F.1B Main Piston

At the beginning of the work cycle the Main Piston is positioned at Main UDP 90, at a point located just where the leading edge 95 is about to expose the connecting hole 75.

F.2 When main piston 15 moves down from Main UDP 90 and passage 75 is exposed, post detonation burned gases can break through the passage to the Main Cylinder to load the Main Piston with High energy Post-Detonation Gases.

F.3 At that point of the cycle both pistons are under a heavy load of post-detonation gases, and are geared to carry the load together (as teamwork and to continue the Work Cycle.

F.4 The Work Cycle lasts as long as the high energy maintains the load on the pistons downward.

G. The Exhaust Cycle

At the end of the work cycle when the main piston 15 starts its journey up, the exhaust valve 35 opens to let the burned products exhaust.

H. The Mixture/Air Loading Cycle

When piston 15 travels down again, the Exhaust Valve 35 closes and the mixture (or air) valve 40 opens to let the mixture (or air) be vacuumed into the cylinders.

I. Cycle Starts All Over Again

All valves close to start the compression cycle all over again.

The Leaschauer Engine Post Compression Fuel Injector Version

Figure 6:
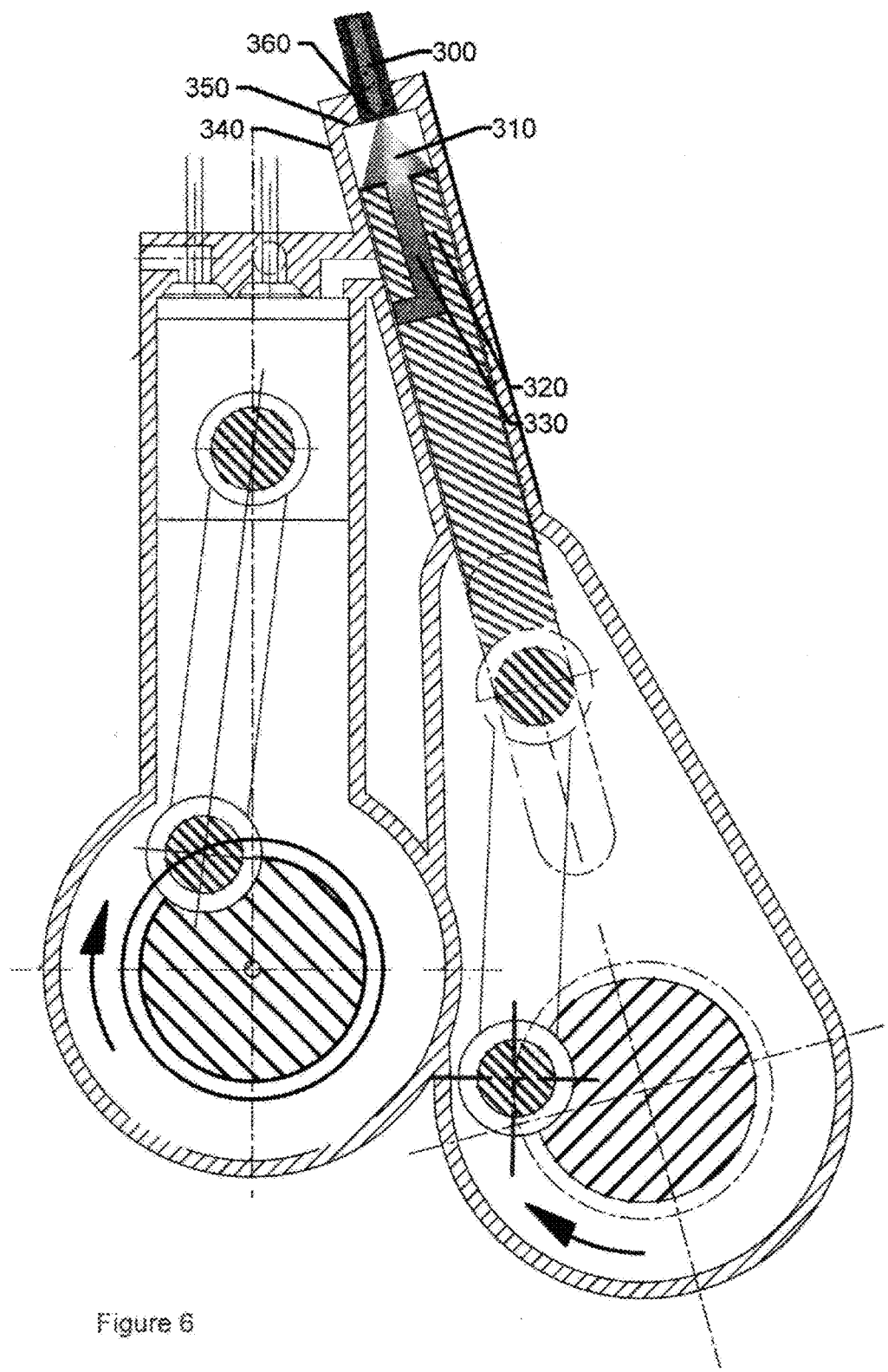
FIG. 6 illustrates a dual compression step ICE machine employing Post (compression) Sequenced Fuel Injection (Post SFI).

An embodiment of the Leaschauer engine, termed the Post (compression) Sequenced Fuel Injector (Post SFI) version, is described below. The Post SFI version contains but is not limited to a practical detailed implementation of the LE and it is an integral part of the invention. This embodiment is illustrated in FIG. 6. As it already defined on P.5, L.6 and on P. 12, L7 and P.11, L28 this category includes the Leaschauer Gas Engine (LGE) which is a single (see FIG. 8), or multi (see FIG. 6) stage(s) high efficiency gas engine. The elements shown in FIG. 6 are listed below:

300. Sequenced high pressure fuel line.
310. Atomized fuel fumes sequenced to be injected into the mini cylinder at the end of the compression cycle when the mini piston is about to reach UDP 350 and when pressure and heat is sufficient to detonate the injected foam.
320. Mini Piston
330. Center Hole.
340. Mini Cylinder
350. Mini UDP
360. Injector In this Post (compression) SFI embodiment the atomized fuel fumes are sequenced to be injected to the mini cylinder at the end of the compression cycle (when the final stage piston is about to reach UDP). At that point the pressure and heat at their peak values, and is the optimal time to inject fuel foam into the cylinder to cause the atomized fuel foam to detonate and to perfect the Leaschauer Engine performance.

The claimed embodiment and process defined by Post (compression) Sequenced Fuel Injection (Post SFI) and the term Leaschauer Gas Engine (LGE) are integral parts of the claim herein.

Figure 8:
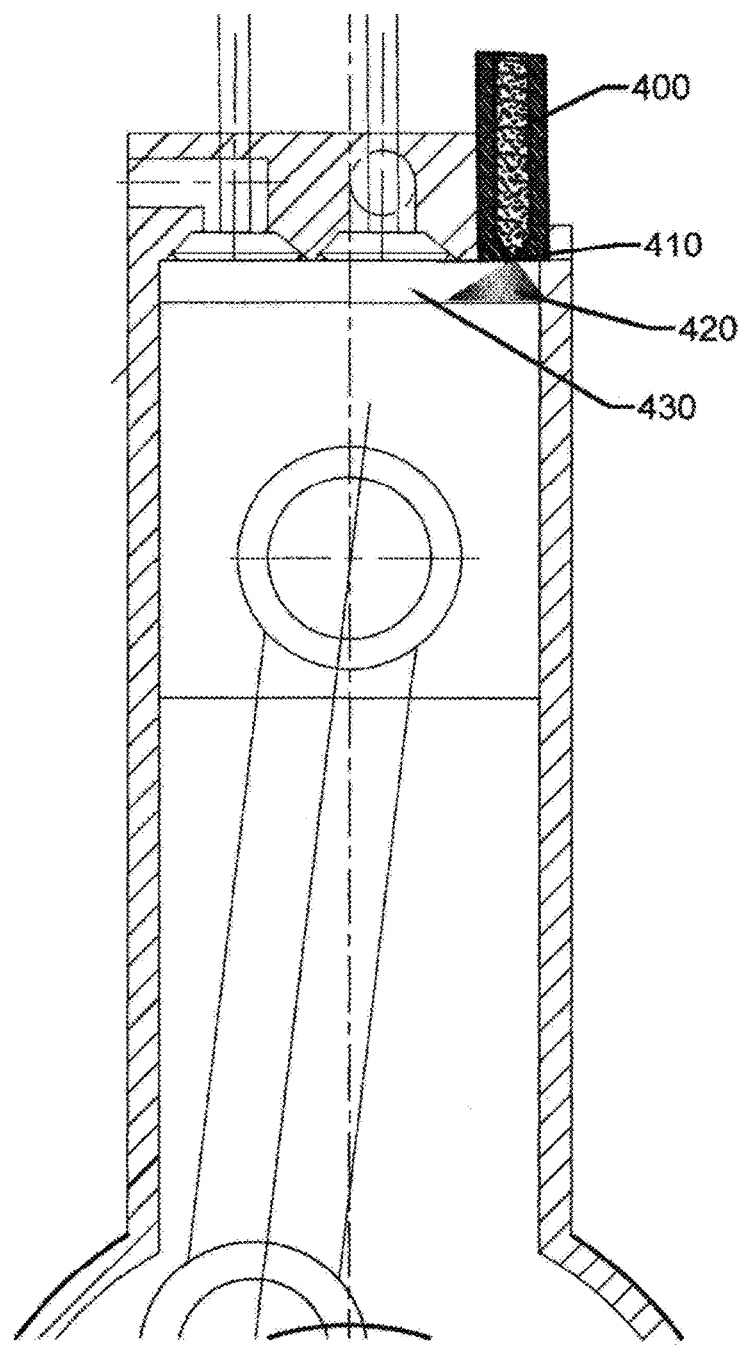
FIG. 8 illustrates the Leaschauer Gas Engine (LGE) referred to as a single step high (combustion) pressure gas machine employing Post (compression) Sequenced Fuel Injection (Post SFI).
Figure 9:
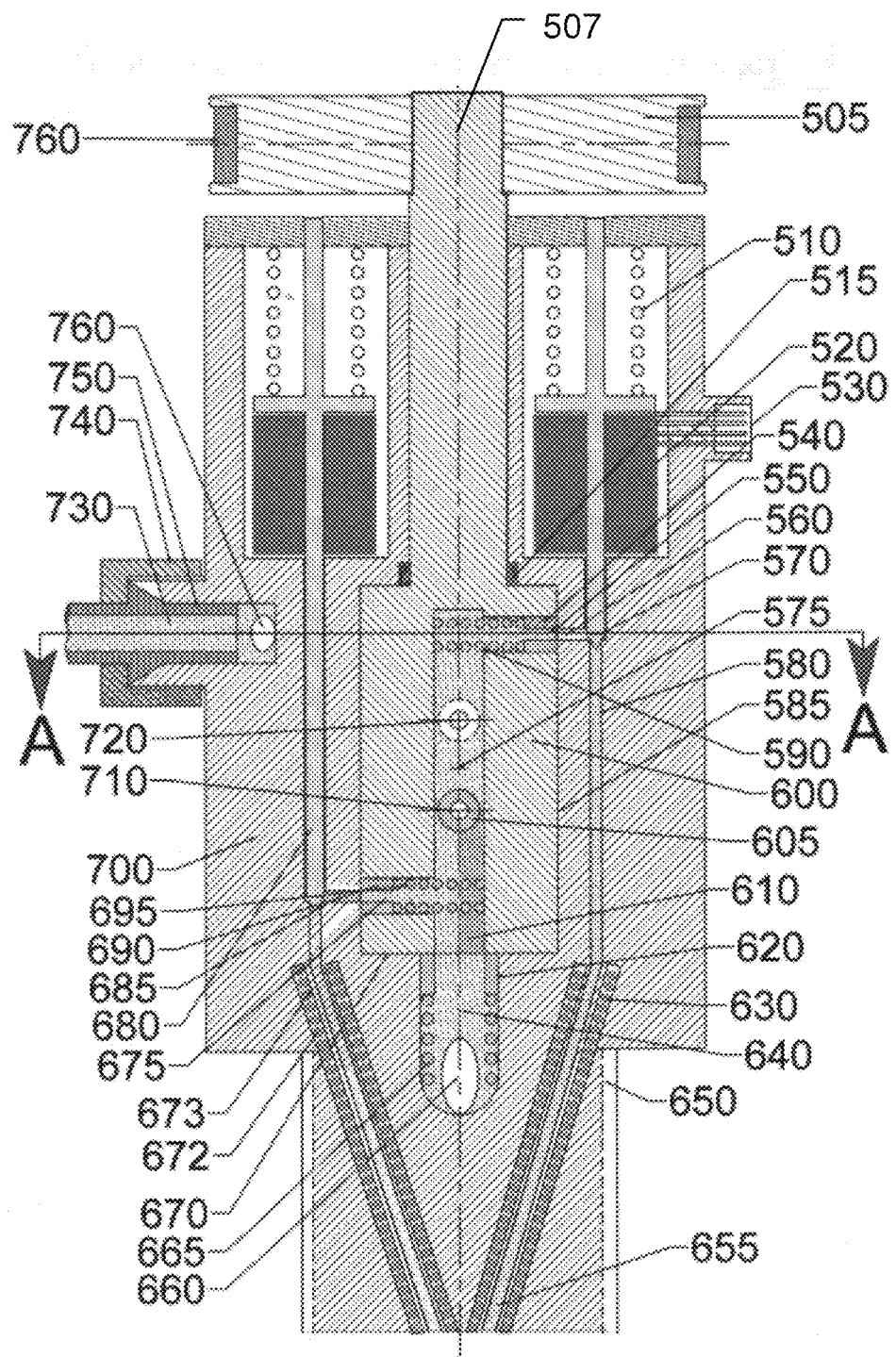
FIG. 9 illustrates a side view of the detailed 'section B-B' (as specified in FIG. 10) of the featured Synchronized Fuel Distributor Injector (SFD Injector) to be implemented as in an accordance of the requirements dictated by the Leaschauer Engine (LE) machine employing Post (compression) Sequenced Fuel Injection (Post SFI) process for one or more compression chambers.
Figure 10:
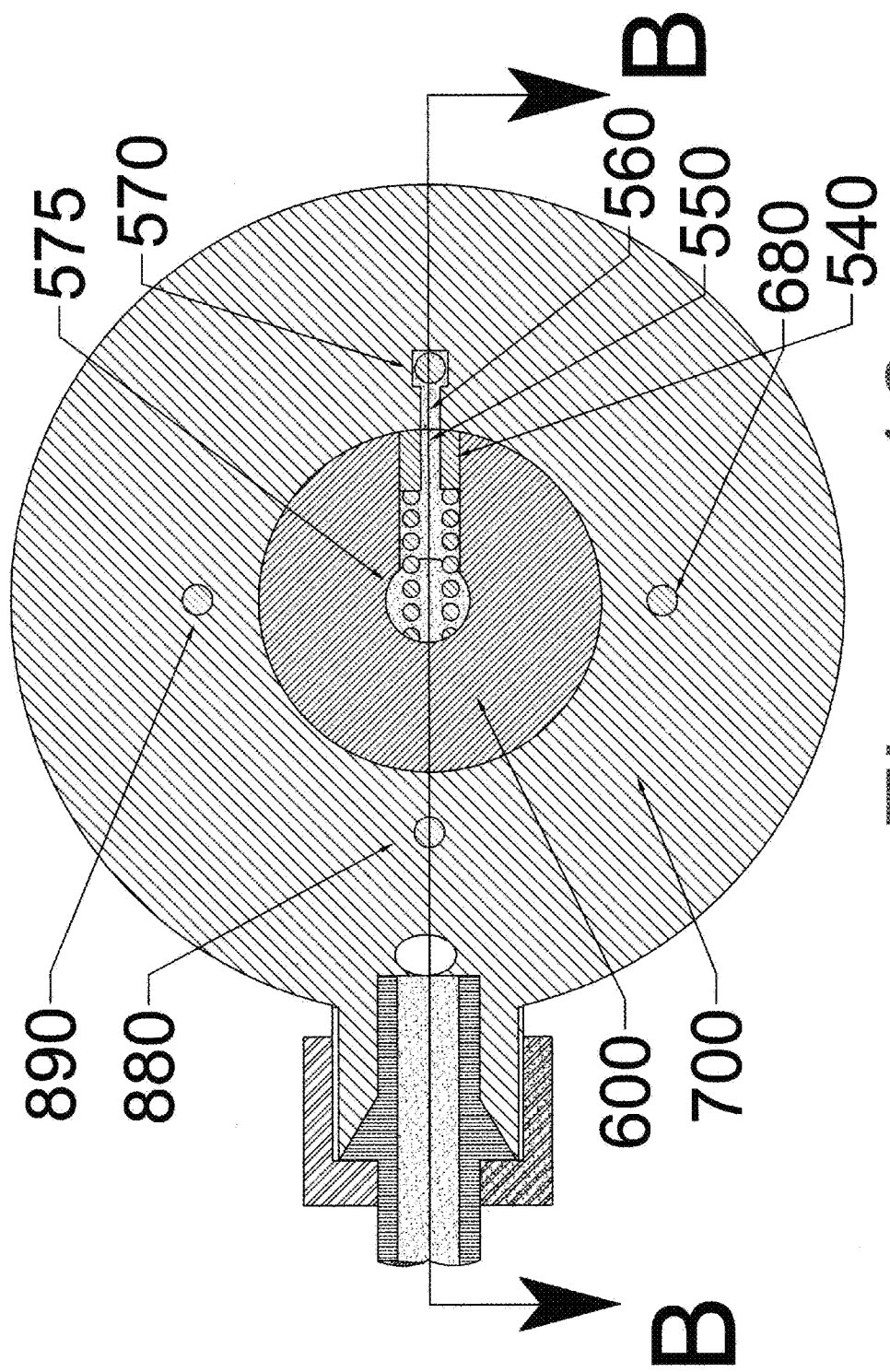
FIG. 10 illustrates a top view of a detailed 'section A-A' of the SFD Injector. It should be mentioned that the number of Cut Off Valves (COV) in the illustrated implementation is four, but this number could be different depending on the specific application.
Figure 11:
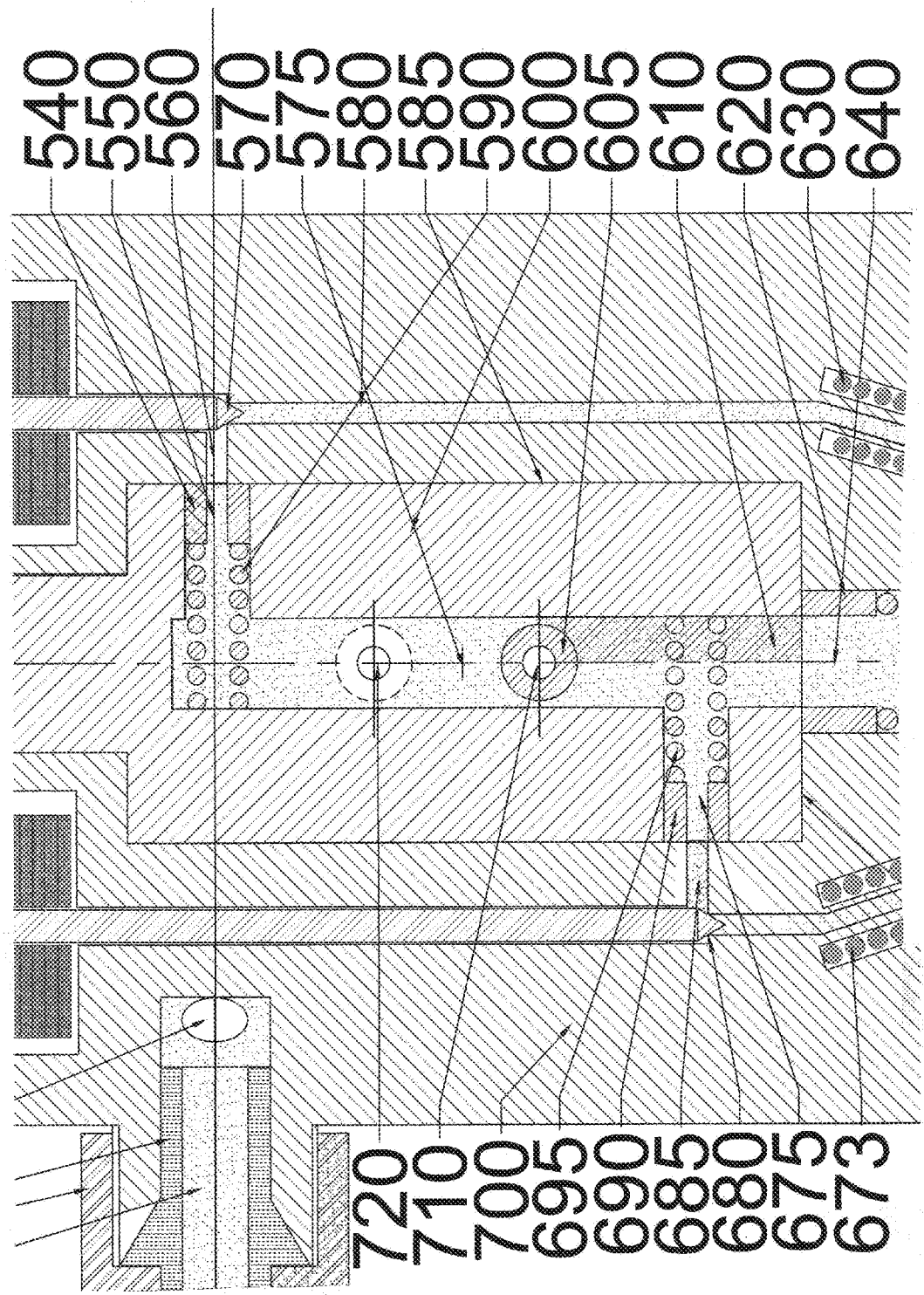
FIG. 11 is a blow up of the distributing windows area to provide a better detail, due to its small size in comparison to the rest of the drawing, for better clarity.

The Leaschauer Single Step Gas Engine (LGE) Machine (See FIG. 8)

FIG. 8 illustrates the practical embodiment and process of a single compression stage LGE Machine. The elements shown and numbered on the figure are listed below:

405. High pressure Post (compression) Sequenced Fuel line.
410. High pressure Post (compression) Sequenced Fuel Injector (SFI). Refer also to section "A general description of the Synchronized Fuel Distributor (SFD) Injector" which contains the implemented SFI injector device referred to as SFD injector. This implemented design should satisfy the specific requirements of the post SFI process
420. Atomized Sequenced Fuel Foams
430. High pressure and heat Post compression air at the optimum air fuel ratio receiving the droplets of fuel which in this condition will cause detonation to occur.

The benefit gained by using Post (compression) Sequenced Fuel Injecting (SFI) as claimed above can be used also in one compression step to implement low octane high efficiency Leaschauer Gas Engine (LGE) (ex. to use high "single" compression step like diesel engine employing Post SFI process and to inject low octane sequenced fuel foam after the compressing buildup is already in its full swing. Holding out the gas until detonation conditions are met avoids the risk of pre-detonation condition. This process can enable the use of high efficiency "Leaschauer Gas Engine" (LGE) to use a low octane gas as a fuel on Diesel principle.

Practical Engine Embodiment of the "Leaschauer Engine"

FIGS. 2-7 illustrate an embodiment of an implementation of the Leaschauer Engine. This implementation is referred to as the "practical engine implementation". This example differs slightly from the embodiment illustrated in FIG. 1, in that for the practical implementation embodiment, the Mini Piston controls the passage 175 for post detonation gases, whereas in the embodiment of FIG. 1, the main piston controls the passage 75. This example clearly indicates that there are many implementation variations of the claimed apparatus and method. Despite the differences, the Non Dependency Effect (NDE) does not change.

Figure 2:
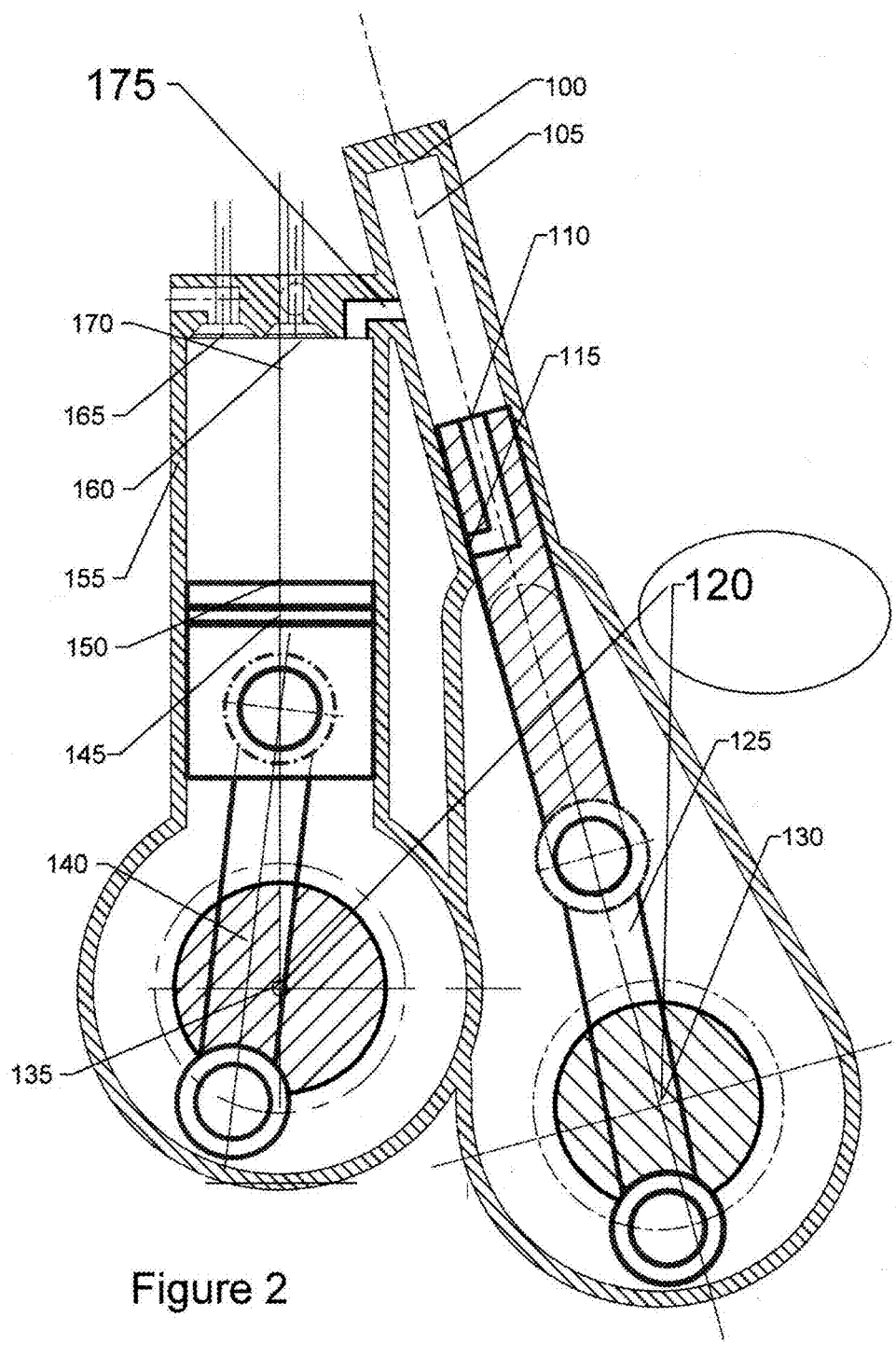
FIG. 2 illustrates stage 1 of the compression cycle: compression starts building up.

FIG. 2 illustrates an overview of the practical embodiment of the LE. Further details are disclosed in subsequent figures about elements such as the gearing elements. The elements shown and numbered on FIG. 2 are listed below:

100. Mini UPD.
105. Mini Cylinder.
110. Mini Piston at lower dead point.
115. Center Hole Blocked in Low end by the cylinder walls at piston's current position.
120. Gearing Mechanism
125. Mini Pushing rode.
130. Mini crankshaft.
135. Main Crankshaft
140. Main Pushing rode
145. Main Piston at lower dead point
150. Lower Dead Point or LPD
155. Main Cylinder.
160. Mixture Valve
165. Exhaust valve
170. main UDP
175. Connection Hole maintains pressure equilibrium on both cylinders at the first compressing stage.

The LE ICE machine differs from a conventional ICE one in that the Leaschauer Engine has a connection hole/passage 175 on its top Main UDP 170 to allow the gases in the compressed cycle to be delivered to the Mini Cylinder 105.

Figure 4:
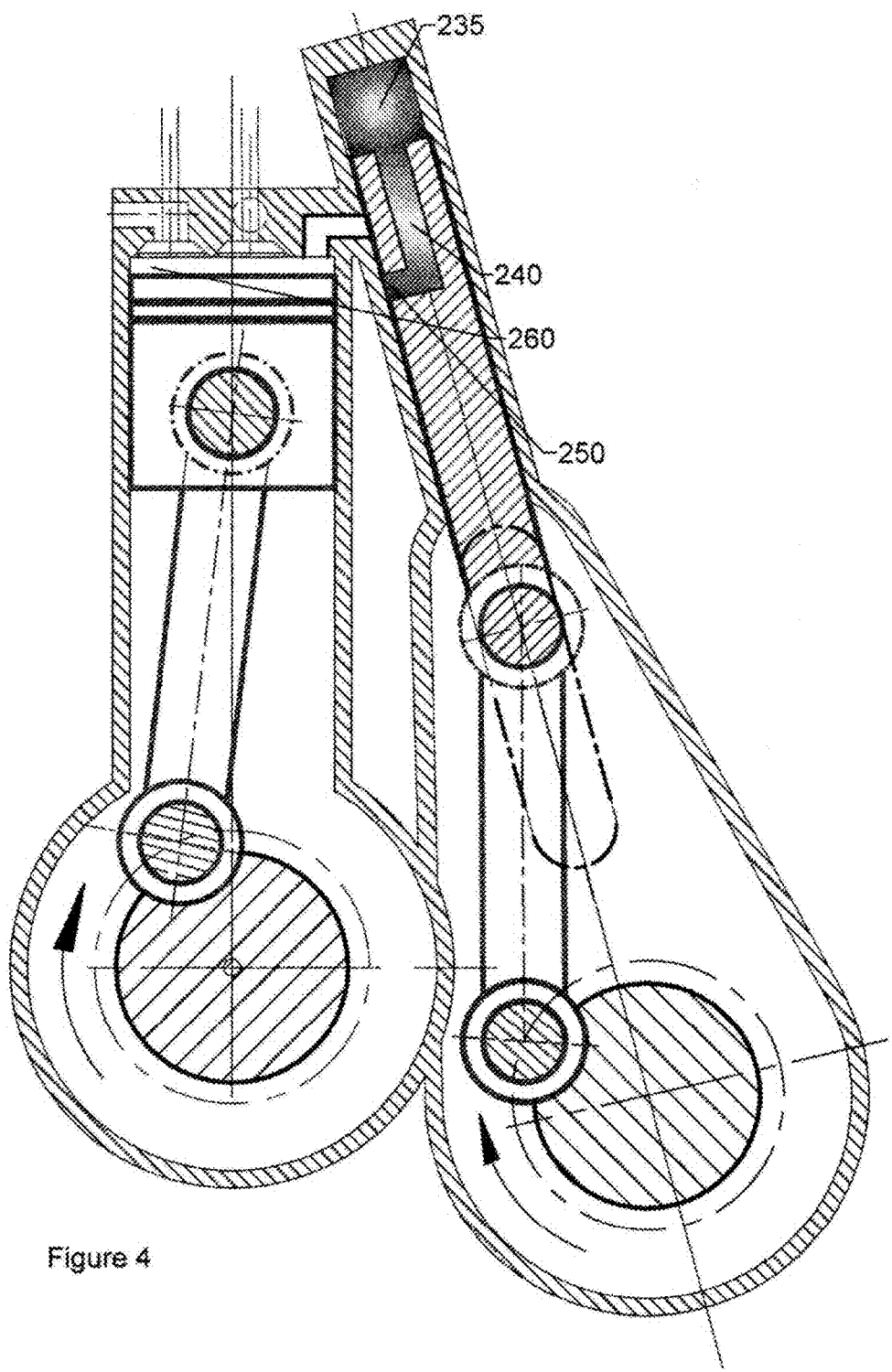
FIG. 4 illustrates stage 3 of the compression cycle: detonation has occurred

The connection hole/passage 175 is located along the Mini Cylinder 105 on its up journey, just before its detonation point see FIG. 4 (generally at the statistical point where the lowest octane fuel is intended to be used; it is detonated under the heat and pressure of the compression cycle). Still, a safe distance should be kept from the detonation point, to avoid unexpected detonation as well as to gain stability of operation.

Figure 5:
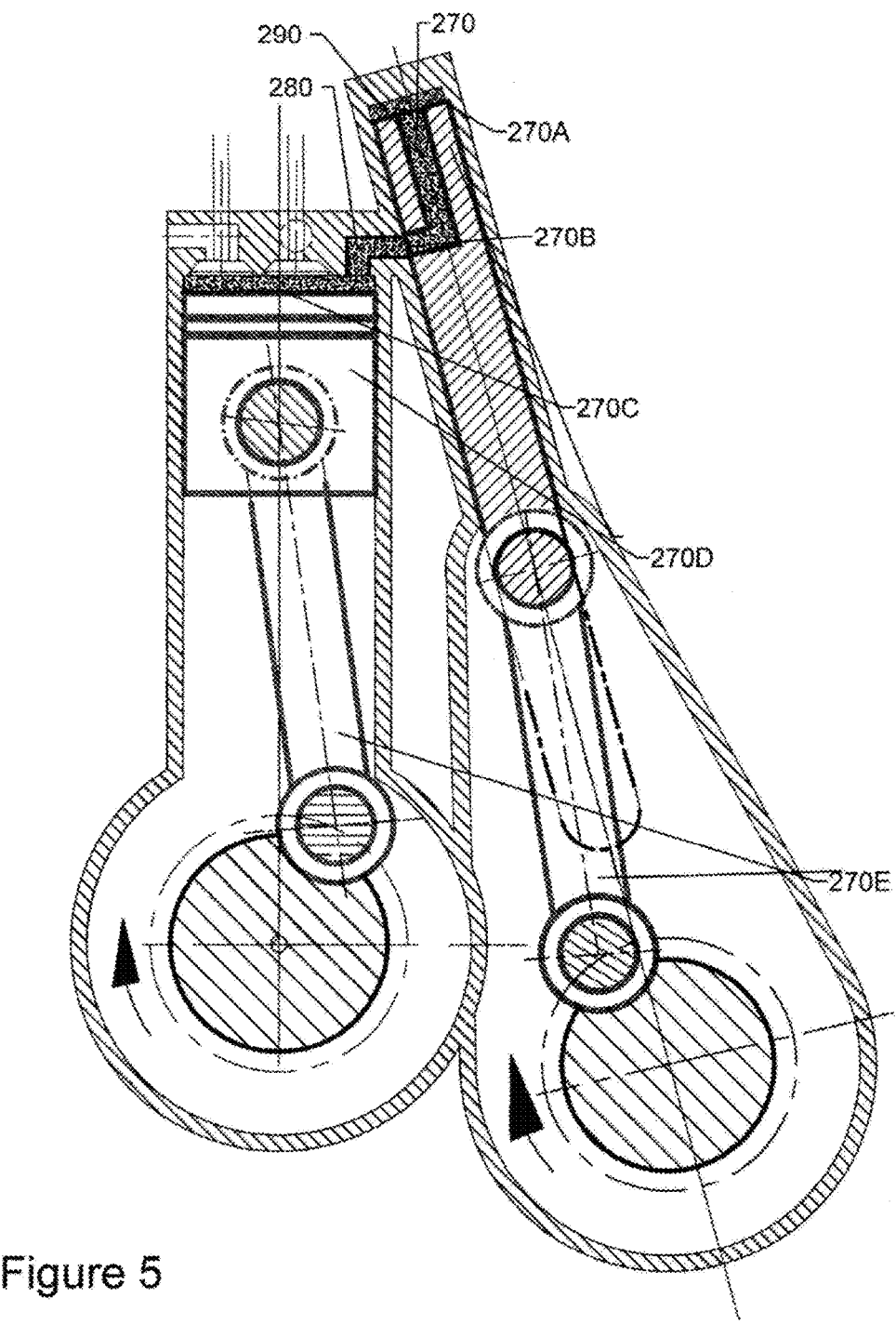
FIG. 5 illustrates stage 4 of the compression cycle: Post Detonation and the start of the work cycle.

Passage 175 or 270B is also used at the work cycle to redirect the high energy gases so as to return to the main cylinder at the start of the work cycle, as shown in FIG. 5.

Figure 3:
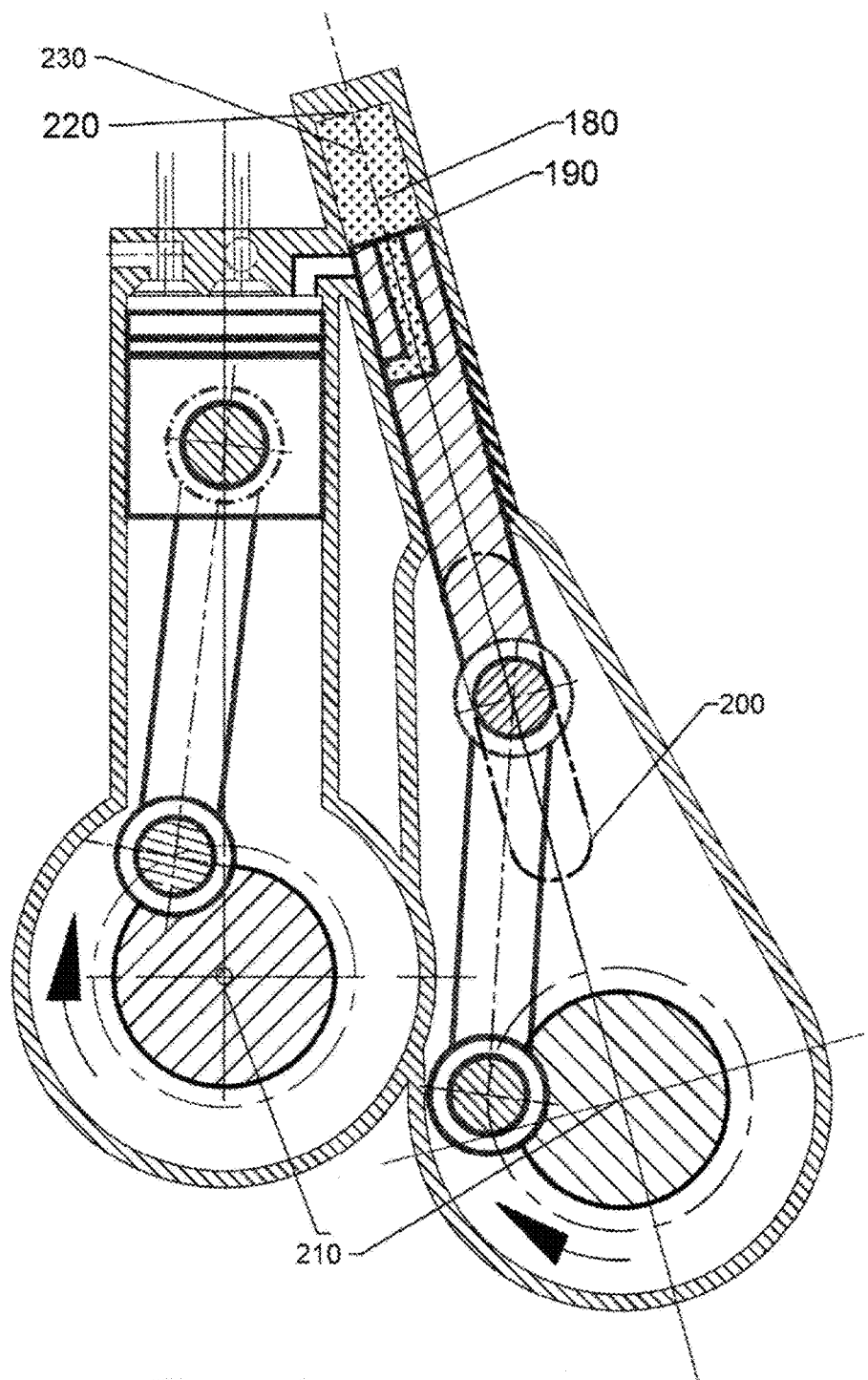
FIG. 3 illustrates stage 2 of the compression cycle: the Mini Piston has passed the cut-off point.

Another difference between the Leaschauer Engine ICE machine and a conventional ICE is the timing mechanism gearing which transfers the rotation movement from the main crankshaft 135 to the secondary crankshaft 130 in sequence to ensure its timing, functionality, stability, cleanliness and efficiency of operation FIGS. 2, 3, 4, and 5 illustrate details of the practical embodiment and its operation. The elements shown and numbered on FIGS. 3-5 are listed below:

FIG. 3:
180. mixture
190. Cut-off Point
200. Mini Piston Guiding Rail
210. Gearing System for engaging and timing the mechanical movement between the crankshafts.
220. Mini UDP
230. At this stage the mini piston passes the cut-off point and the mixture is fully contained and locked in the mini cylinder. The mini piston is pushed to UDP 220 by the gearing mechanism to complete the compression cycle where the heat and pressure will detonate the mixture FIG. 4:
235. The extreme heat and pressure detonate the mixture in the mini cylinder and in the center hole, which is also used as a gas expansion space.
240. Center Hole
250. The center hole is blocked by the cylinder walls at the current position.

FIG. 5:
270. At the post detonation stage the mini piston has reached UDP and the following has occurred:
  270A. mini piston is loaded with post detonation gases at extreme pressure and energy
  270B. the mini piston center hole "is aligned with the connecting hole to open a passage" for post detonation Gases to reach the main cylinder.
  270C. As a result post detonation gases are applying extreme pressure on the main piston as well.
  270D. The main piston along with the mini piston, under the load of post detonation gases, together convert the load to be applied to the rotational work cycle.
  270E. Pushing rods set in position to transfer the work load to the crankshaft
280. Connecting hole.
290. Center hole.

Details of the LE Practical Embodiment Compression Mechanism

The mini cylinder 105 is added to the Leaschauer Engine to further compress the mixture to an extreme pressure in order to achieve high performance high efficiency and clean detonation.

The gearing mechanism 120 slows down/delays the rotation movement of the main piston 260 and keeps it in proximity of Main UDP 220 while pushing/advancing the mini piston 230 towards the detonation point (the detonation point refers to the final stage piston statistical location point where the lowest octane fuel at the increasing compression process will detonate. (See illustration 4 for a general idea of the piston position). Note: As mentioned earlier, the connection passage 175 is positioned just before the detonation point along the mini cylinder, but at a safe distance from it to avoid risking unexpected detonation and to gain stability of operation.

At Mini UDP 100 the mini piston's center hole 270A, 270B is aligned with the connecting hole, a position which enables the return of gases via the passage, to release the post detonation gases (at extreme energy and high pressure conditions) to the main cylinder 270D to start the work cycle.

This event occurs, as mentioned and as illustrated in FIG. 5, when the mini Piston 270A reaches the Upper Dead Point 270 and exposes the return hole/passage 270B-280.

Figure 7:
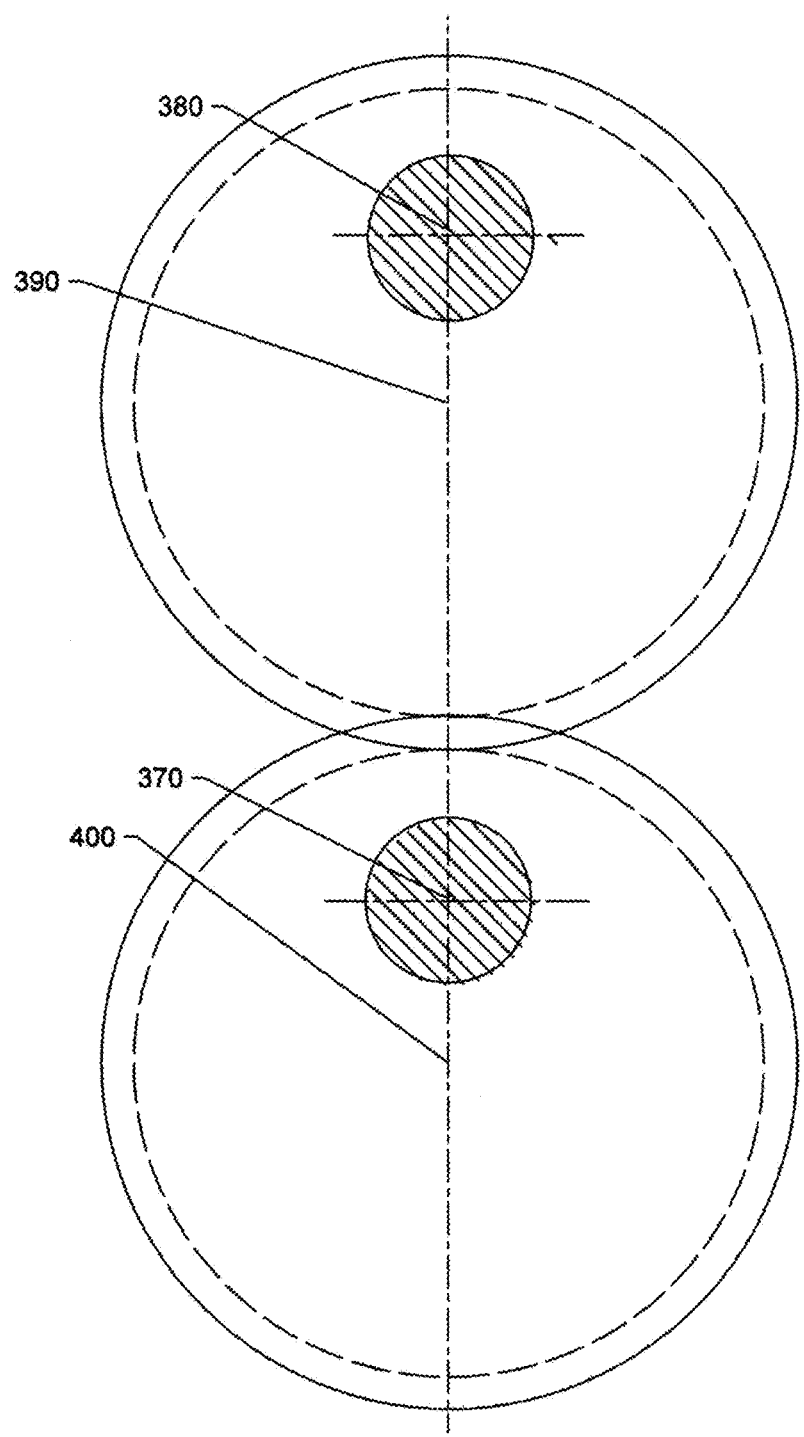
FIG. 7 illustrates the timing gear mechanism.

FIG. 7 illustrates in more detail the timing gear mechanism 120, which is an integral part of the claimed invention. The elements shown in FIG. 7 are listed below:
  370. Main Crankshaft
  380. Mini Crankshaft
  390. Mini non-eccentric elliptical teeth wheel
  400. Main non-eccentric elliptical teeth wheel Timing gear mechanism 120 is comprised of (See FIG. 7) two elliptical non-eccentric teeth-wheels. The driver wheel 400 is connected to the main crankshaft 370 and the driven wheel 390 is connected to the secondary crankshaft 380.

The teeth-wheels' respective speeds depend on the momentary ratio between their radii that are designed to suit the angular speed required for efficient operation of the crankshafts 380, 400 and the entire engine.

Details of the Leaschauer Engine Operating Cycle as Illustrated by the Practical Embodiment:
Compression Cycle The Compression Cycle, illustrated in FIGS. 2-5, begins when all valves 160-165 are closed and the main piston 145 is forced up from its LDP by the gearing mechanism at a fast pace to travel from the lower dead point 150 towards the upper dead point 170. The mini piston is maintained at the mini LDP 110.

Step 1:
In the $1^{st}$ step of the compression cycle, (see illustration 2) a portion of the compressed mixture (or air) from the main cylinder 145 passes to the mini cylinder 105 via the connecting hole 175 to maintain equilibrium pressure between the cylinders.

Step 2:
During the $2^{nd}$ step of the compression cycle (see illustrations 2, 3) the timing gearing mechanism ensures that as the main piston reaches its Upper Dead Point 170 the mini piston 105 reaches its cut-off point 190, (the point where the mini piston passes the connecting hole 175 and gases are fully contained and locked in the mini cylinder 105 as well as in the Center Hole 115).

Step 3:
During the $3^{rd}$ Compression step, the gearing mechanism ensures that the main piston is still maintained in proximity of the Upper Dead Point 170 and that the mini piston 190 is pushed out towards the detonation point.

Step 4:
During the $4^{th}$ step of the Compression cycle (see illustration 4), the pressure and temperature are dramatically increasing, causing the mixture (for the pre SFI version) to detonate. Alternatively, for the post SFI version, at peak pressure and heat, fuel foam is injected and detonated.

After detonation has occurred, the mini piston continues to be advanced upwards by the gearing mechanism, and the pressure and heat keep increasing. This ensures that all fuel products with higher octane numbers have sufficient conditions to burn as well as the time which such burn requires. (see note 4 P.19, L.5 for the Sufficient Combustion Process or (SCP)

When the mini piston is further advancing (See Illustration 5) towards the Mini Upper Dead Point 270A, the mini piston central hole 290 is aligned with the connection hole 280. At that position the passage 280, 290 open and enables the streaming of post detonation gases to be released to the main cylinder. At that point the work cycle begins.

Note: since the location of the connecting hole 280 along the mini cylinder determines the cut-off point in the mini cylinder, it is crucial to correctly position the cut-off point as close as possible to the detonation point. The positioning of the cut-off point should be based on the lowest octane fuel intended to be used.

The design, the process and the engine implementation structure included herein are an integral part of the claimed invention.
Work Cycle The work cycle is illustrated in FIG. 5.
The Mini Cylinder Action:

At the compressing stage and especially after the detonation, high pressure, high energy post detonation gases apply a tremendous pressure on the mini piston 270A. Due to the small area of the mini piston, the mini piston rod is able to mechanically withstand the high pressure. The gearing mechanism ensures that the mini piston travels all the way to Mini UDP against the heavy load to complete the compressing cycle.

The Main Cylinder Action:

The gearing mechanism keeps the main cylinder in proximity of the Main UDP 270D until the mini piston reaches its UDP 270 (the point where the center hole 290 is aligned with the connecting hole 280 and the passage 280, 290 lets post detonation gases break through and reach the main cylinder).

The pistons work together to carry on the work cycle.

After the post Detonation gases have loaded the main piston, the main piston works as a team with the mini piston in carrying on together the work load.

The work cycle lasts as long as the high energy and high pressure of the post-detonation gases are maintained, to force the main and mini pistons down to their respective LDP's.

Exhaust Cycle

The exhaust cycle elements are illustrated in FIG. 2.

When the main piston 145 reaches the Lower Dead Point LDP 150 and starts its journey up, the exhaust valve 165 opens and enables the burned gases to be released and exhausted.

Mixture (or Air) Load Cycle

The Mixture (air) load cycle elements are illustrated in FIG. 2.

When the main piston reaches the Upper Dead Point 170 and starts its journey down, the exhaust valve 165 closes, and the mixture (or air) valve 160 opens, thus letting fresh mixture (or air) to be vacuumed into the main cylinder.

As the main piston reaches the Lower Dead Point again both valves are kept closed and the compressing cycle starts again.

Conclusions

The Leaschauer Engine utilizes a novel process which employs:

Compressed air as defined in definition 8

Processed pre-mist fuel as defined in definition 9

Injecting the processed pre-mist fuel into the compressed air during a restricted defined window close to the UDP, with a strictly defined phase as described in definition 7

In one embodiment of the Leaschauer Engine, a small size single piston is employed, the small sized piston able to deal mechanically with the high force applied on the piston, rods and crankshaft due to the extreme pressure and the corresponding dramatic decrease of the air volume due to the extreme compressed air.

In an embodiment of the Leaschauer Engine, a first stage turbocharger compressor is coupled with a single small cylinder, or a small cylinder which is capable of compressing the air within it into a very small geometric area to achieve extreme high pressures.

In another embodiment of the Leaschauer Engine, as illustrated in FIGS. 1-7, a large primary cylinder is coupled to a secondary small cylinder, wherein the large cylinder is used as a pre-compression stage, and the secondary small cylinder deals with the tremendous pressure, extreme mechanical forces, and volume decrease due to the extreme pressure.

Note that the embodiments described herein are illustrative and not limiting. Many other embodiments are possible to implement the novel Leaschauer Engine process outlined in points 1-3 above.

Notes

Note 1: It is important to mention that during the times the cleaning cycle and the mixture (or air) loading cycle are being performed in the main cylinder; the mini piston is repositioned in an idle mode, unless geared to 0.5 of the main piston speed.

Note 2: It is also important to mention that a different embodiment of the Leaschauer Engine (See illustration 6 and P.4, L27) could significantly improve the atomized fuel loading cycle by timing the fuel 300 to be injected directly to the mini cylinder 340 (at a post compression sequenced positive high pressure), a process that could improve the timing and combustion efficiency. This improvement is an integral part of the claimed invention.

Note 3: In order to reduce the dimension size of the Leaschauer Engine a mini piston guided rail 200 is added. The guide is necessary to enable the use of a shorter mini piston, preventing long term damage to the mini piston due to the cross (side) pressure component forced by the mini connecting rod on the piston. The guide supports the mini piston in its LDP stage 110 from shifting sideways due to the pushing rod action. The mini piston guide rail is an integral part of this invention.

Note 4: It is further important to note that in the EL design stage the total length of the mini cylinder has to take into consideration the combustion period of the fuel products. That period continues beyond the detonation point and while the fuel product is still in the burning stage the mini piston is further compressing the burning mixture, all the way up until reaching UDP, to ensure completion of the combustion process. The claimed note 4 termed Sufficient Combustion Process or (SCP) is integral part of the invention The result of the Leaschauer Engine SCP process is to ensure that the fuel is detonating and that all the fuel components have completed their burning process before mini piston 320 reaches UDP 350.

The Leaschauer Engine benefits from the aforementioned qualities by handling very well multi (mixed) octane fuels, as the detonation pressure and heat are increasing dramatically as the fuel continues to burn within the final compressing (mini-) cylinder until the mini-cylinder reaches the Mini UDP.

The SCP process and the notes above are an integral part of the claimed invention.

It is not expected that the invention be limited to the exact embodiments disclosed herein. Those skilled in the art will recognize that changes and modifications may be made without departing from the inventive concept. The scope of the invention should be construed in view of the claims.

With this in mind, I claim:

1. An apparatus comprising:
an internal combustion engine designed to provide a Post (compression) Sequenced Fuel Injection (Post SFI) Leaschauer Combustion Process (LCP), said internal combustion engine including:
a main piston housed in a main cylinder;
a main axle shaft;
said apparatus configured to enable air to fill said main cylinder prior to compression of said main cylinder;
means for providing Specific Extreme Air Pressure (EAP) compressed air in said cylinder housing said main piston;
means for providing Processed Pre-Mist Fuel (PMF);
means for injecting the processed pre-mist fuel into the specific Extreme Air Pressure (EAP) compressed air in said main cylinder during a restricted defined window close to UDP of the main cylinder, where pressure and heat are at peak values, with a strictly defined phase;
whereby said fuel injection moment is accurately controlled and timed to provide Post SFI and to thereby enable extreme high compression combustion (Extreme Pressure Detonation EPD) without risk of pre-detonation; and
wherein said engine is enabled to utilize low-octane fuel without pre-detonation.

2. The apparatus of claim 1, wherein said means for injecting the processed pre-mist fuel (PMF) into the compressed air (specific Extreme Air Pressure EAP) during a restricted defined window close to UDP of the main cylinder, with a strictly defined phase, is a synchronized fuel distributor (SFD) injector, said SFD injector having a main SFD rotor shaft synchronized to said main axle shaft with a 2:1 gearing ratio.

3. The apparatus of claim 2, wherein said restricted defined window close to UDP of the main cylinder, is less than 30 out of 360 degrees rotation of said main SFD rotor shaft.

4. The apparatus of claim 2, wherein said restricted defined window close to UDP of the main cylinder, is less than 3 out of 360 degrees rotation of said main SFD rotor shaft.

5. The apparatus of claim 2, where said strictly defined phase is injecting PMF into EAP beginning in the range between 15 degrees rotation of said main SFD rotor shaft before UDP to 15 degrees rotation of said main SFD rotor shaft after UDP.

6. The apparatus of claim 2, where said strictly defined phase is injecting PMF into EAP beginning in the range between 1 and 6 degrees rotation of said main SFD rotor shaft before UDP.

7. The apparatus of claim 2, wherein said SFD injector includes;
a circular geometric shaped injector valve;
a gearing mechanism which synchronizes the injector circular valve to said main axle shaft with a 2:1 gearing ratio.

8. The apparatus of claim 7, wherein;
said circular geometric shaped injector is comprised of a stator housing containing a circular rotating rotor;
the relative position of the circular rotor within the stator housing determines whether a rotor distributing window is aligned with a stator distributing window to enable/disable flow of high pressure fuel through said circular valve of said injector; and
said SFD injector circular valve is connected to a main external SFD rotor shaft.

9. The apparatus of claim 2, wherein said SFD injector is designed to inject high pressure fuel mist supplied by an external pump into extreme compressed air pressure in the cylinder with enough force to propel the mist into highly pressurized compressed air in the cylinder.

10. The apparatus of claim 1, including a single small size piston, the small sized piston being able to reduce mechanically high tension and ease high force applied on piston, rods and crankshaft due to the extreme pressure and decrease of air volume due to the extreme compressed air within said cylinder.

11. The apparatus of claim 1, including a first stage turbocharger compressor coupled with a single small cylinder.

12. The apparatus of claim 1, including a small cylinder which is capable of compressing air within it into a very small geometric area to achieve extreme high pressures.

13. The apparatus of claim 1, including a large primary cylinder coupled to a secondary small cylinder, wherein the large cylinder is used as a pre-compression stage, and the secondary small cylinder deals with tremendous pressure, extreme mechanical forces, and volume decrease due to the extreme pressure.

14. A compression process for an internal combustion engine comprising the steps of:
compressing air to provide Specific Extreme Air Pressure (EAP) compressed air in a main cylinder housing a main piston;
providing processed pre-mist fuel;
injecting the processed pre-mist fuel into the compressed air during a restricted defined window close to UDP of the main cylinder, with a strictly defined phase; and
accurately controlling and timing said fuel injection moment to provide Post SFI and to thereby enable extreme high compression combustion without risk of pre-detonation.

15. The apparatus of claim 13, comprising:
an internal combustion engine designed to provide a Leaschauer Combustion Process (LCP), said internal combustion engine including:
a main piston housed in a main cylinder; and
a secondary small-dimension piston housed in a small dimension cylinder, said secondary small-dimension piston and cylinder configured to achieve a high compression ratio during said compression process to yield extreme fuel combustion pressure;
said secondary small-dimension cylinder coupled to said main cylinder in a configuration to enable transference of said extreme fuel combustion pressure from said secondary small-dimension cylinder to said main cylinder to enhance operation of said main cylinder.

16. The apparatus of claim 15, wherein said high compression ratio is greater than 22:1.

17. The apparatus of claim 16, configured to enable air to fill said main cylinder and said small dimension cylinder prior to compression of said small dimension cylinder, and further configured to enable injecting of atomized fuel into said small dimension cylinder at a point in said compression process where pressure and heat are at peak values and cause said atomized fuel to detonate and yield post-detonation gases.

18. The apparatus of claim 17, further configured to enable distribution of said post-detonation gases into said main cylinder to aid in a main cylinder power stroke.

19. A compression process for an internal combustion engine having a main cylinder and a secondary small dimension cylinder coupled to said main cylinder comprising the steps of:
filling said main cylinder and said small dimension cylinder with air;
injecting atomized fuel into said small dimension cylinder at a point in said compression process where pressure and heat are at peak values to provide Post SFI and to cause said atomized fuel to detonate and yield post-detonation gases;
releasing said post-detonation gases into said small dimension cylinder to yield extreme fuel combustion pressure;
aligning a hole in a piston of said small dimension cylinder with a connecting hole in a piston of said main cylinder to open a passage for post detonation gases to reach the main cylinder, and
distributing said post-detonation gases into said main cylinder to aid in a main cylinder power stroke.

* * * * *